March 9, 1954
M. BUIS
2,671,645
APPARATUS FOR RAPIDLY MIXING AND CONTROLLING THE
TEMPERATURE OF IMMISCIBLE LIQUIDS
Filed Jan. 25, 1949
2 Sheets-Sheet 1
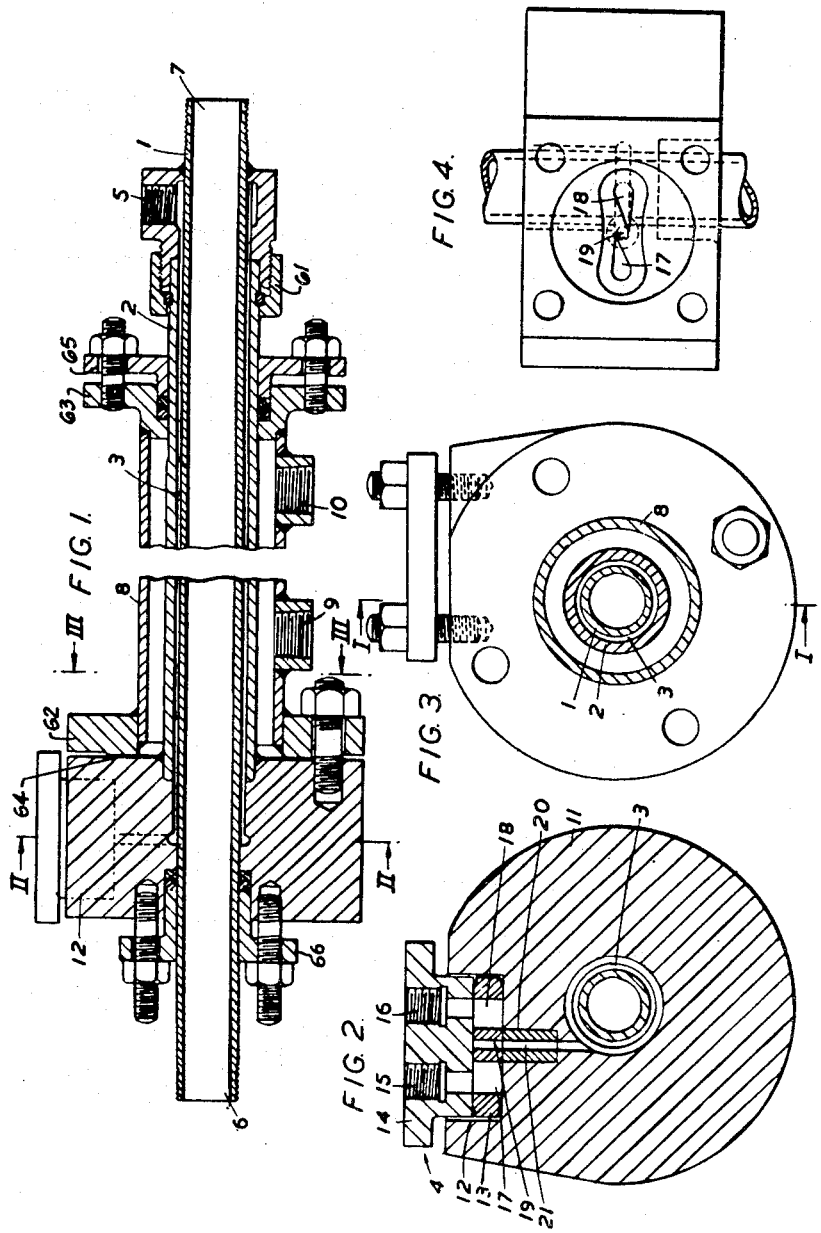
Inventor:
Marinus Buis
By Donald H. Milmore
his Attorney March 9, 1954  M. BUIS  2,671,645
APPARATUS FOR RAPIDLY MIXING AND CONTROLLING THE
TEMPERATURE OF IMMISCIBLE LIQUIDS
Filed Jan. 25, 1949  2 Sheets-Sheet 2
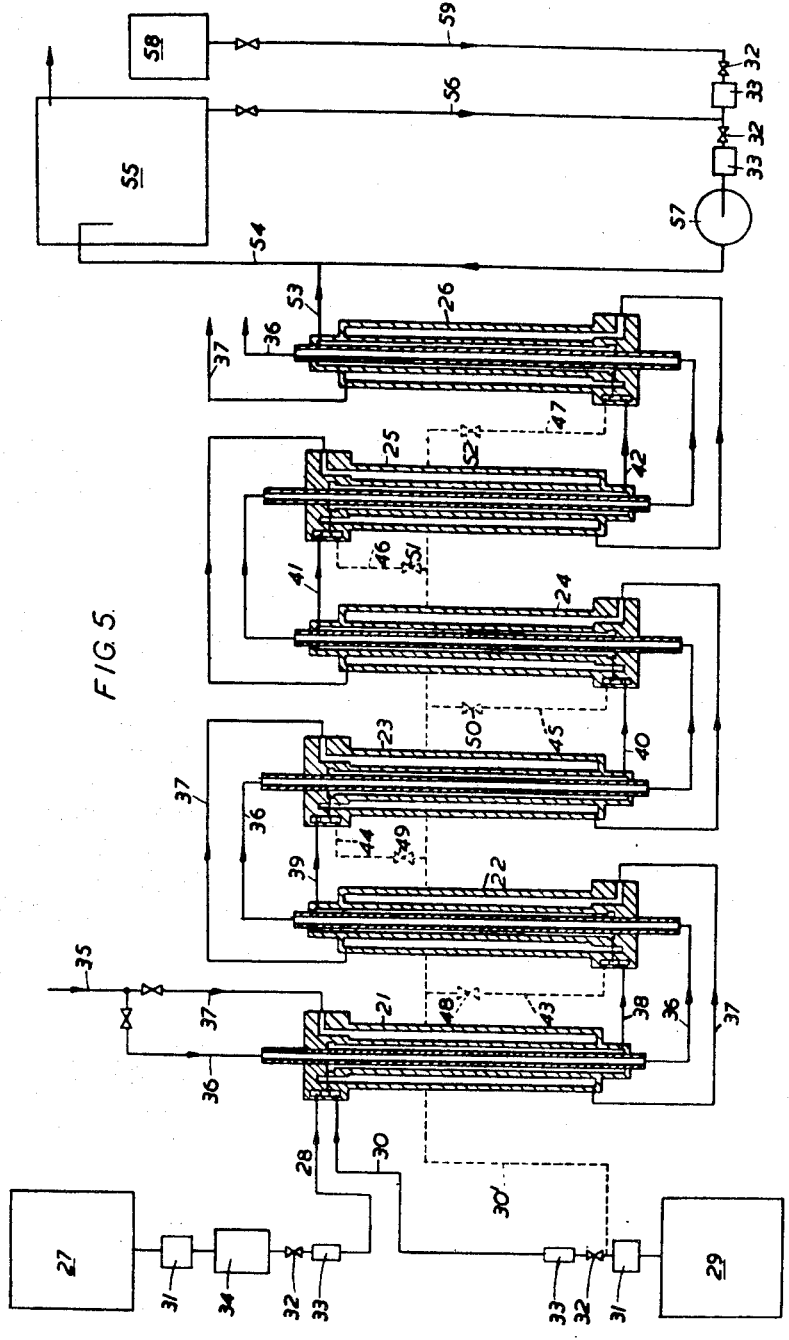
Inventor:
Marinus Buis
By Oswald H. Milmore
his Attorney Patented Mar. 9, 1954

2,671,645

UNITED STATES PATENT OFFICE 2,671,645

APPARATUS FOR RAPIDLY MIXING AND CONTROLLING THE TEMPERATURE OF IMMISCIBLE LIQUIDS

Marinus Buis, London, England, assignor to Shell Development Company, San Francisco, Calif., a corporation of Delaware Application January 25, 1949, Serial No. 72,558

Claims priority, application Great Britain January 27, 1948

6 Claims. (Cl. 257—246)

This invention relates to a method and apparatus for effecting rapid and thorough mixing of two or more liquids which are at least partially immiscible (herein referred to as immiscible liquids) to form a dispersion and controlling the temperature of the resulting mixture while maintaining the dispersion, e. g., either abstracting heat therefrom or adding heat thereto. The method and apparatus are particularly adapted for carrying out highly exothermic or endothermic chemical reactions with short contact times.

In such exothermic chemical reactions great difficulty often arises from the necessity of abstracting the heat of reaction in order to prevent the formation of undesirable by-products, or of rapidly cooling the reacting mixture after an optimum contact time. While the problem of adding heat in the case of endothermic reactions is usually less acute, the instant invention is applicable also to such reactions. Aside from the necessity for abstracting or adding heat to the mixture, it is important in short contact time reactions that the reagents be rapidly and intimately mixed so that they will occur throughout the mixture in the proper proportions, avoiding local excesses or deficiencies of one or more of them. Only by achieving rapid mixing and maintaining the proper dispersion in the reaction zone, coupled with proper temperature control, is it possible to attain the maximum yield of the desired reaction product.

The immiscible reacting liquids must be maintained as a dispersion during the reaction. If this dispersion is fed through a reaction zone under highly turbulent conditions, however, the reaction rate sometimes rises so far that it is impossible to abstract the heat of reaction with apparatus of reasonable dimensions. It is, therefore, important to maintain the dispersion in the reaction zone so as to avoid turbulence therein, or at any rate to avoid too great a degree of turbulence.

This problem has heretofore been recognized and has led to many suggested expedients, involving, for example, mixing nozzles with whirl chambers and reaction chambers with cooling or heating jackets. (See article by La Mer and Read, J. Amer. Chem. Society, vol. 52, pp. 3098–3111, August 1930; and Brit. Pat. No. 602,627.) However, mixing of the reagents was found to be not complete enough to attain the best yields, especially when one or more of the liquids has a high viscosity at the mixing temperature.

The use of ordinary mixing nozzles has proven unsuitable because the chemical reaction begins immediately upon contact therein of the reagents, and it is not practicable to provide nozzles with adequate heat transfer means to control the temperature of the dispersion.

In many reactions involving immiscible liquids, such as the sulphation reaction, the rate determining factor in the reaction is the diffusion of the reactants to the interface compared with the rate of diffusion, the chemical reaction appears often to proceed instantaneously and the selection of the optimum contact time depends primarily on the mixing. With good mixing (i. e., turbulent flow conditions), very short contact times will be sufficient (e. g., less than 5 seconds when sulphating olefins with 98% sulfuric acid). With less efficient mixing (laminary flow conditions), appreciably longer times are required, depending on diffusion factors (the concentration gradients to the interface and the diffusion constant).

Thus, two different types of reactor are potentially desirable, characterized by:

a. Turbulent flow conditions; or
 b. Laminary or orderly (i. e., non-turbulent) flow and optimum conditions for diffusion.

The establishment of truly turbulent flow conditions in the reaction mixture presents various problems, such as the difficulty of pumping because of the high viscosity of the liquids. Moreover, too great a reaction rate requires too great a rate of heat transfer, either into the mixture or out of the mixture, depending upon whether the reaction is endothermic or exothermic, respectively.

It is, therefore, an object of the invention to provide an improved method and apparatus for bringing two or more immiscible liquids rapidly into intimate contact and controlling their temperature by feeding the resulting dispersion promptly after formation into an annular reaction zone having large heat transfer surfaces, the dispersion being given a motion which will cause continued mild mixing of the liquids in the reaction zone without any appreciable degree of turbulence and with optimum conditions for diffusion. Ancillary thereto, it is an object to provide a method and apparatus for rapidly mixing and controlling the temperature of immiscible liquids, whereby a chemical reaction may take place between said liquids or between certain components thereof, the mixing being arranged to minimize the contact time, thereby making it possible to attain high yields of the desired end products with substantial avoidance of undesired byproducts.

By way of example, the invention may be applied to a process of sulphating olefins, e. g., to the production of secondary alkyl sulfates possessing excellent wetting and detergent properties, by reacting olefins with sulfuric acid under controlled conditions of temperature and contact time. In such reactions it is possible to utilize various olefins, particularly mixtures of hydrocarbons containing olefins obtained by cracking petroleum wax or petrolatum, as well as mixtures consisting substantially or entirely of such olefins, and even individual olefins as found in such mixtures; sulfuric acid of various concentrations, usually above 75% concentration, and, preferably, between 88 and 97%, may be used. Such sulphation reaction proceeds rapidly and is highly exothermic; if contact between the acid and olefins is prolonged the yield of secondary alkyl sulphates is adversely affected by undesired side reactions. Other examples of chemical reactions are sulfonation of aromatic compounds such as alkylated phenols and benzene; nitration of aliphatic or aromatic hydrocarbons; and alkylation of isoparaffinic and aromatic hydrocarbons in the presence of sulfuric acid or other catalysts.

Briefly, according to this invention the several immiscible liquids are fed separately, continuously and simultaneously tangentially into an elongated whirl chamber of very small diameter and capacity to produce a whirling and advancing dispersion; this dispersion, containing the liquids in finely divided form, is then fed tangentially into an elongated annular reaction chamber near one end thereof, the reaction chamber being bounded by closely spaced heat transfer walls, so as to provide a large surface to volume ratio; the mixture is withdrawn from the opposite end of the reaction chamber. The two walls are spaced apart by a distance or gap which is of the same order of magnitude as and, preferably, less than that of the mixing nozzle, e. g., from 0.1 to 2 times the diameter of the mixing nozzle, while the outside diameter of the annular reaction chamber is considerably larger than the gap between the walls, e. g., from 3 to 50 times the gap. The two walls are cooled or heated by flowing a thermal fluid, e. g., cold or hot water, on their opposite surfaces. The whirling and advancing dispersion forms a helically advancing current in the annular reaction chamber. This current, at least near the inlet end, also has a whirling motion about a helical axis and on a very small diameter, which is effective in continuing the mixing action and in maintaining the dispersion without the necessity of using highly turbulent flow velocities throughout the reaction chamber. This creates optimum conditions for diffusion.

The time during which the liquids or reactants are in contact in the apparatus is dependent primarily upon the rate of flow of reactants and the length of the annular reaction chamber. In commercial practice convenience may be served by arranging a number of units consisting of mixing nozzles and reaction chambers in series. Thus, the present method and apparatus are particularly adapted for subjecting a liquid to repeated contacts with successive portions of another liquid or reactant, either immediately after withdrawal from a reaction chamber, or after stopping the reaction by adding an inhibiting or neutralizing agent. Thus, in another aspect, the present invention contemplates passing a liquid successively through a series of mixing and temperature controlling units, each comprising a mixing nozzle and annular reaction chamber as described above, and mixing it with another liquid in each mixing nozzle. By such an arrangement it is possible to achieve a high rate of throughput without materially affecting the high yields obtainable with lower rates of flow, and considerable flexibility is given a plant in that more units can be employed in the series at high rates of flow.

In such an arrangement it may be preferred, in order to obtain a high yield of a desired reaction product when using a high concentration of one of the reactants (e. g., when using sulfuric acid of high concentration when sulfating olefins), to admix a part only of the first reagent (e. g., acid) required for reaction with the other reagent (e. g., olefins) in the mixing nozzle of the first reactor, and to admix the remainder of the first reagent with the partially reacted mixture in the mixing nozzle of a subsequent reactor or reactors.

The invention will be described in detail by describing the application of the method and apparatus to the sulphation of olefins, it being understood that the apparatus and the method of mixing and controlling the temperature may be applied to other liquids, and that the specific apparatus illustrated in the drawings is merely exemplary of the invention. In the drawings:

Fig. 1 is a longitudinal sectional view of a reaction chamber, corresponding to a section line I—I on Fig. 3;

Figs. 2 and 3 are transverse sectional views taken on lines II—II and III—III of Fig. 1;

Fig. 4 is a detail view corresponding to a plan view of Fig. 2 with the block 14 removed; and Fig. 5 is a flow diagram of a complete sulfation plant employing a plurality of reactors in series.

The apparatus shown in Figs. 1-4 comprises an inner tube 1 and a concentric outer tube 2 defining between them an elongated narrow, annular reaction chamber 3 having a large surface to volume ratio. An inlet and mixing arrangement, generally indicated by the numeral 4, is provided at the inlet end of the reaction chamber 3; an outlet 5 for the mixture is provided at the other end in a bushing welded toward the outlet end to the inner tube 1 and threadedly connected to a gasket-sealed coupler 61 for sealing to the outer tube 2. A thermal fluid, e. g., water, brine or steam, is circulated through the inner tube 1 in either direction, preferably concurrently with the flow of liquids through the reaction chamber; for this purpose there is an inlet 6 and an outlet 7. A thermal fluid is also circulated on the outside of the tube 2 through a tubular jacket 8, having an inlet 9 and an outlet 10. The jacket 8 may be welded to annular sealing members 62 and 63, the former being bolted to the reactor head 11 and sealed against it by a gasket 64, and the latter being sealed against the outer tube 2 by a gland 65.

The inlet and mixing arrangement 4 comprises, as shown in Figs. 2-4, a cylindrical reactor or tube head 11 recessed to receive the tubes 1 and 2 forming the walls of the reaction chamber; these tubes are secured to the head in a leak-tight manner, viz., by welding the tube 2 and providing a sealing flange 66 for the tube 1. It will be noted that the bore of the head 11 accommodating tube 1 is doubly counterbored, first for approximately half its length to an internal diameter which may be the same as the internal diameter of tube 2, and, secondly, for a shorter length to the outside diameter of tube 2, whereby a minor part of the outer wall of the reaction chamber is formed by the head 11. This part of the outer wall, as well as the part of the tube 2 extending into the head, are not cooled directly and should be kept as small as practicable. A recess 12 in the side of the head 11 carries a swirl plate 13 and header block 14, the latter having a plurality of inlets for the liquids to be mixed. Thus, two inlets 15 and 16, which may serve for the admission of sulphuric acid and olefins, respectively, are shown; it is immaterial to which of the inlets the reactants are supplied. The swirl plate 13 has recesses 17 and 18 so shaped and located as to be in communication with the inlets 15 and 16 and to direct the liquids tangentially into a swirl chamber 19 in the center of the plate. Coaxial with and adjoining the swirl chamber is a nozzle 20 which may, for example, be made of metal, ceramic, or temperature-resistant glass; the last named material is particularly desirable when dealing with corrosive liquids which undergo a rise in temperature upon being mixed. The nozzle 20 serves as a pre-mixer for subdividing and intimately mixing the liquids, preferably under non-turbulent flow conditions, while advancing as a whirling dispersion. This nozzle communicates at its discharge end with a bore or duct 21 within the head 11, entering the annular reaction chamber 3 tangentially.

In using the device the liquids are supplied to the inlets 15 and 16 under suitable pressure and at flow rates sufficient to cause rapid swirling in the chamber 19 and nozzle 20. In view of the small volumetric capacity of the nozzle 20 and its small diameter, the residence time of the liquid therein may be held to a low value, and high flow velocities are produced. The dispersion is swirling about the axis of the nozzle 20 and duct 21, which axis is tangential to the annular reaction chamber 3. Consequently, the dispersion advances through the annular reaction zone as a helically advancing current, and, in addition, partakes of a swirling motion about a helical axis within the annular space at least within the part of the reaction chamber near to the inlet end. The latter motion has a path resembling the strands of a spirally wound rope extending out from the end of the duct 21 and wound helically within the annular reaction chamber. Such motion is herein designated as a swirling helical motion. As a result of these motions mixing is continued without the necessity of having a flow velocity through the reaction chamber which would cause violent turbulence. The liquids, therefore, follow orderly instead of turbulent paths through the reaction chamber differing from true laminary flow, thereby promoting heat transfer from the walls of the tubes 1 and 2 while avoiding excessive and random turbulence which would cause an undesirably high reaction rate and heat of reaction. The flow through the reaction chamber may become largely laminar before reaching the outlet. The invention is not, however, limited to the preferred embodiment wherein laminar flow is attained, and may be practiced with turbulent flow and with swirling helical motion throughout the reaction chamber.

The dimensions of the various parts may, of course, be selected from a wide range of values, dependent upon the intended throughput, residence or contact time, the required rate of heat transfer to or from the mixture and whether or not turbulent flow (i. e., Reynolds numbers above about 21,000) is desired. When highly endothermic or highly exothermic reactions are involved the volume of the mixing nozzle must be small, so as to result in extremely short residence times in the mixing nozzle; moreover, the cross-sectional area of the nozzle should be small so as to result in a high flow velocity which induces rapid swirling as well as rapid axial flow therethrough. However, since turbulence is usually to be avoided to prevent too great a reaction rate in the uncooled mixing nozzle the diameter should, in the preferred embodiment for such reactions, be large enough to avoid turbulence. By way of example, the nozzle may be conveniently designed to cause nominal residence times therein of between 0.5 and 50 milliseconds, and linear velocities of between 1 and 100 ft. per sec. The ratio of the volume of the reaction chamber 3 to the volumetric rate of flow may be selected as desired to result in any desired contact or residence time; for effective heat transfer it is, however, important that the ratio of the cross-sectional area of the annular reaction chamber 3 to the sum of the perimeters of the walls be kept low. This ratio is proportional to the gap between the walls and may, for example, be between about 0.01 inch and 0.4 inch (corresponding to gaps of 0.02 inch and 0.8 inch, respectively). The values given in this paragraph are, however, not to be regarded as limiting the scope of the invention.

A typical arrangement may have the following dimensions:

Total throughput of both liquids
                                gals./hr__  426
Mixing nozzle:
    Diameter _____in__  0.296
    Length _____in__   1.0
    Liq. velocity_____ft./sec__  33.1
    Nominal residence time__millisec-
        onds _____  2.5

Reaction chamber:
    O. D. of internal tube_____in__  3.400
    I. D. of external tube_____in__  3.548
    Width of gap_____in__  0.074
    Length _____in__   100
    Av. liquid velocity_____ft./sec__   2.8
    Nominal residence time_____sec__   3.0
    Ratio cooling surface (sq. in. per
        linear inch) to area of passage (sq.
        in.) _____in__    27

Fig. 5 shows diagrammatically a layout of a plant for carrying out a sulphation reaction using a battery of six reactors 21 to 26, each having a mixing nozzle of the type previously described and arranged in series. Number 27 denotes a supply of olefin, e. g., a cracked $C_{10}$–$C_{18}$ fraction which is fed through line 28 at room temperature or a low temperature e. g., 25° to 30° F., into one side of the swirl plate of the first reactor 21. Similarly, sulfuric acid is fed from a supply 29 through line 30 into the other side of swirl plate of reactor 21. Strainers 31, control valves 32 and flow indicators 33 are provided in each of the feed lines 28 and 30. If desired a pre-cooler 34 may be included in the olefin feed line 28.

Cooling water or brine from a supply line 35 is circulated through all the reactors in series, line 36 feeding internal tubes 1, and line 37 feeding cooling jackets 8. The reacting mixture is thereby maintained at a desired temperature, e. g., between about 40° F. and 200° F., preferably below about 125° F., depending upon the acid concentration.

Reacted or partially reacted mixture leaving reactor 21 is fed through line 38 into one side of the swirl plate of reactor 22. Similarly, the outlet from reactor 22 is fed through line 39 into reactor 23, and so on through lines 40, 41 and 42 into reactors 24, 25 and 26, respectively.

As previously explained, it may be desirable in some cases to split one of the reactants, e. g., the acid over two or more reactors. For this purpose, a line 30' may be additionally provided having branches 43, 44, 45, 46 and 47 controlled respectively by valves 48, 49, 50, 51 and 52 leading respectively to the other sides of the swirl plates of reactors 22, 23, 24, 25 and 26.

The reacted mixture leaving the final reactor 26 is rendered alkaline by introducing it through line 53 into a circulating stream of reacted mixture in line 54 which has already been rendered and is continuously maintained alkaline. The stream of reacted mixture in line 54 is circulated on a balance or surge tank 55 and line 56 by a pump or the like 57, a base, for example caustic soda, from a supply tank 58, being continuously added to the reacted mixture, to maintain a slight excess of base, through line 59 to the suction side of pump 57. Control valves 32 and flow indicators 33 may be provided in this circuit. The overflow 60 from the balance tank 55 is collected for working up as necessary to the desired final product.

Using an apparatus of the kind described above and proceeding in the manner set forth it is possible to maintain a high rate of flow of the reactants and a total reaction time which is close to the desired optimum, e. g., one minute for all six reactors, without sacrificing entirely adequate temperature control of the reaction at all points and without any serious loss of olefins through undesired side reactions. Indeed, it is possible by choosing the optimum acid strength, ratio of acid to olefins, reaction time and temperature, for a particular olefin feed stock, to achieve yields of secondary alkyl sulphates in excess of 80 per cent of the theoretically maximum yield.

I claim as my invention:

1. Apparatus for rapidly mixing and controlling the temperature of immiscible liquids comprising a tube head, a pair of substantially elongated concentric tubes fitted in leak-tight relation to the head to provide an annular chamber therebetween, means for feeding a thermal fluid through the inner tube, a jacket surrounding the outer tube, means for circulating a thermal fluid through said jacket, a bore in said head communicating tangentially with said annular chamber near one end thereof, said bore forming a mixing nozzle, discharge means near the other end of said chamber, a plurality of separate inlet ducts for admitting said liquids separately into the mixing nozzle, and means for imparting a swirling motion to said liquids in the mixing nozzle.

2. The apparatus according to claim 1 wherein the inlet ducts comprise a swirl plate mounted on said head, said plate having a central swirl hole in communication and alignment with said bore, and tangential ports in said swirl plate for feeding said liquids tangentially into the hole.

3. The apparatus according to claim 1 wherein a removable liner of heat resistant glass is mounted within said bore between said means for imparting swirling motion to said liquids and said annular chamber.

4. Apparatus for rapidly mixing and controlling the temperature of immiscible liquids comprising a tubular mixing nozzle of small volumetric capacity, a plurality of separate inlet ducts disposed tangentially with respect to the nozzle for admitting said liquids separately into the nozzle near one end thereof, means for imparting a swirling motion to said liquids therein, a pair of elongated substantially concentric tubes providing a narrow annular chamber therebetween, the gap between the walls of said tubes being between about 0.02 and 0.8 inch, means for flowing a thermal fluid in contact with the outer face of the outer tube and in contact with the inner face of the inner tube, duct means connecting said mixing nozzle with said annular chamber near one end thereof and tangentially with respect to the annular chamber, and means for discharging liquids from the other end of the annular chamber.

5. Apparatus for rapidly mixing and controlling the temperature of immiscible liquids one of which is mixed with the other at a plurality of successive points, comprising a battery of mixing units, each unit having: a tubular mixing nozzle, a plurality of separate inlets for admitting liquids separately into the nozzle near one end thereof, means for imparting a swirling motion to said liquids within said nozzle, a pair of elongated substantially concentric tubes providing an annular chamber therebetween, means for flowing a thermal fluid in contact with the outer face of the outer tube and in contact with the inner face of the inner tube, duct means connecting said mixing nozzle with said annular chamber near one end thereof and tangentially with respect to the annular chamber, and means for discharging liquids from the other end of the annular chamber; and means for transferring liquid discharged from the annular chamber of each unit except the last to an inlet of the mixing nozzle of a succeeding unit.

6. A fluid treating system for mixing and controlling the temperature of immiscible liquids comprising a tubular mixing nozzle communicating with a tubular annular chamber formed by a pair of concentric tubes, means for flowing a thermal fluid in contact with both outer faces of the annular chamber, a plurality of separate inlet ducts for admitting said liquids separately into the nozzle near one end thereof, means for imparting a swirling motion to said liquids within said nozzle, duct means directly connecting said mixing nozzle with said annular chamber in tangential relation to the chamber walls near one end thereof so positioned as to induce a swirling helical current in the liquid during its passage through the said tubular annular chamber, the plane of swirl being substantially at right angles to that imparted by the said swirl-imparting means of the nozzle, and means for discharging liquids from the other end of the annular chamber.

MARINUS BUIS.

References Cited in the file of this patent

UNITED STATES PATENTS

| Number | Name | Date |
|---|---|---|
| 1,842,877 | Muller et al. | Jan. 26, 1932 |
| 2,302,008 | Daun | Nov. 17, 1942 |
| 2,534,253 | Fash | Dec. 19, 1950 |
| 2,545,028 | Haldeman | Mar. 13, 1951 |

FOREIGN PATENTS

| Number | Country | Date |
|---|---|---|
| 602,627 | Great Britain | May 31, 1948 |